United States Patent [19]
Avni et al.

[11] Patent Number: 6,146,481
[45] Date of Patent: Nov. 14, 2000

[54] METHODS FOR MANUFACTURE OF REINFORCED COMPOSITE VESSEL

[75] Inventors: Benzion Avni, Kfar Saba; Leonid Lukov, Beer Sheva; Yuly Liberman, Beer Sheva; Oleg Bachmutsky, Beer Sheva, all of Israel

[73] Assignee: Polybar Technologies, Mishor Yamin, Israel

[21] Appl. No.: 09/049,062

[22] Filed: Mar. 27, 1998

[51] Int. Cl.$^7$ ....................................................... B31C 3/16
[52] U.S. Cl. .......................... 156/169; 156/172; 156/173; 156/175
[58] Field of Search ...................................... 156/169, 172, 156/173, 175, 425, 430, 431, 428; 242/441.2, 476.2

[56] References Cited

U.S. PATENT DOCUMENTS

| | | |
|---|---|---|
| 993,151 | 5/1911 | Campbell . |
| 3,032,461 | 5/1962 | Baker ........................................ 156/175 |
| 3,100,171 | 8/1963 | Hardesty . |
| 3,131,104 | 4/1964 | Korn . |
| 3,201,298 | 8/1965 | Baker et al. ............................ 156/431 |
| 3,210,228 | 10/1965 | Bluck . |
| 3,245,624 | 4/1966 | Meyers et al. . |
| 3,255,976 | 6/1966 | Mede . |
| 3,258,379 | 6/1966 | Ponemon et al. . |
| 3,282,757 | 11/1966 | Brusse .................................. 156/165 X |
| 3,301,505 | 1/1967 | McLarty . |
| 3,316,337 | 4/1967 | North . |
| 3,336,176 | 8/1967 | Medney . |
| 3,338,271 | 8/1967 | Plummer et al. . |
| 3,344,592 | 10/1967 | Geisinger . |
| 3,378,427 | 4/1968 | McLean . |
| 3,379,591 | 4/1968 | Bradley . |
| 3,519,520 | 7/1970 | Newman, Jr. . |
| 3,783,068 | 1/1974 | Brown . |
| 3,970,495 | 7/1976 | Ashton et al. . |
| 4,077,828 | 3/1978 | Strom . |
| 4,172,562 | 10/1979 | Smith ...................................... 156/425 |
| 4,217,158 | 8/1980 | Puck . |
| 4,251,036 | 2/1981 | McLain . |
| 4,288,267 | 9/1981 | McLarty .............................. 156/425 X |
| 4,388,129 | 6/1983 | Oizumi et al. . |
| 4,448,015 | 5/1984 | Usui . |
| 4,544,426 | 10/1985 | Stockman . |
| 4,758,397 | 7/1988 | Schreiner et al. . |
| 4,857,124 | 8/1989 | Shobert et al. ........................ 156/149 |
| 5,266,139 | 11/1993 | Yokota et al. . |

FOREIGN PATENT DOCUMENTS

| | | |
|---|---|---|
| 370 109 | 1/1989 | European Pat. Off. . |
| 54-15699 | 6/1979 | Japan ...................................... 156/175 |

OTHER PUBLICATIONS

Jones et sal, "Improving Composite Laay–Up for Non–Spherical Filament–Wound Pressure Vessels", *Compositess: Part A,*, 27A:311–317, 1996.

Yu et al, "Problems of the Mechanics of Composite Winding", Chap. II, pp. 47–51.

Vaccarella et al, "An Innovative Fully Automated RTM Plant for Class "A" Mass Transit Applications", Peter V. Vaccarella, Ashland Chemical Co., Dublin, Ohio.

Dow Chemical Co., P.O. Box 12121, 1100 AG Amsterdam Zuldoost, Netherlands—Brochure re: Derakane.

*Primary Examiner*—Jeff H. Aftergut
*Attorney, Agent, or Firm*—Mark M. Friedman

[57] ABSTRACT

A reinforced composite vessel and a method for its manufacture. A cylindrical mandrel capped by two convex, cylindrically symmetrical caps is supported externally only at a proximal end thereof, and is rotated and translated with respect to a strand delivery system to wrap the mandrel with at least two strands, in multiple strokes. A mechanism is provided to ensure that the strands are laid flat and undamaged onto the mandrel. As the caps pass the strand delivery system, the strands overlap and anchor each other. A liquid binder is mixed intimately with a catalyst and is depressurized to release dissolved gases. The binder is applied to the wrapped mandrel by causing a quantity of the binder sufficient to coat the mandrel to surround one end of the mandrel and then move towards the other end as an advancing annulus. This is accomplished by placing the mandrel vertically in a coating chamber along with the volume of binder, and reducing the volume of the chamber to force the binder up past the mandrel.

12 Claims, 15 Drawing Sheets

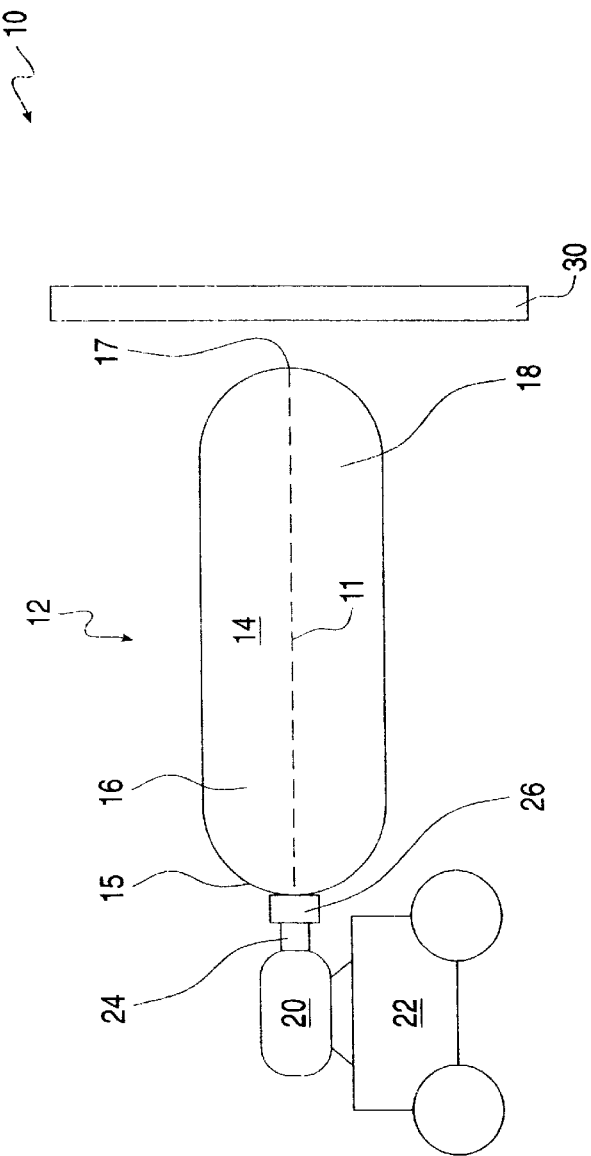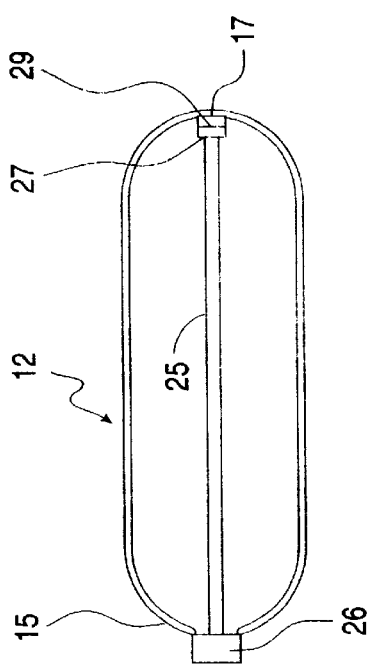
FIG.1A
FIG.1C

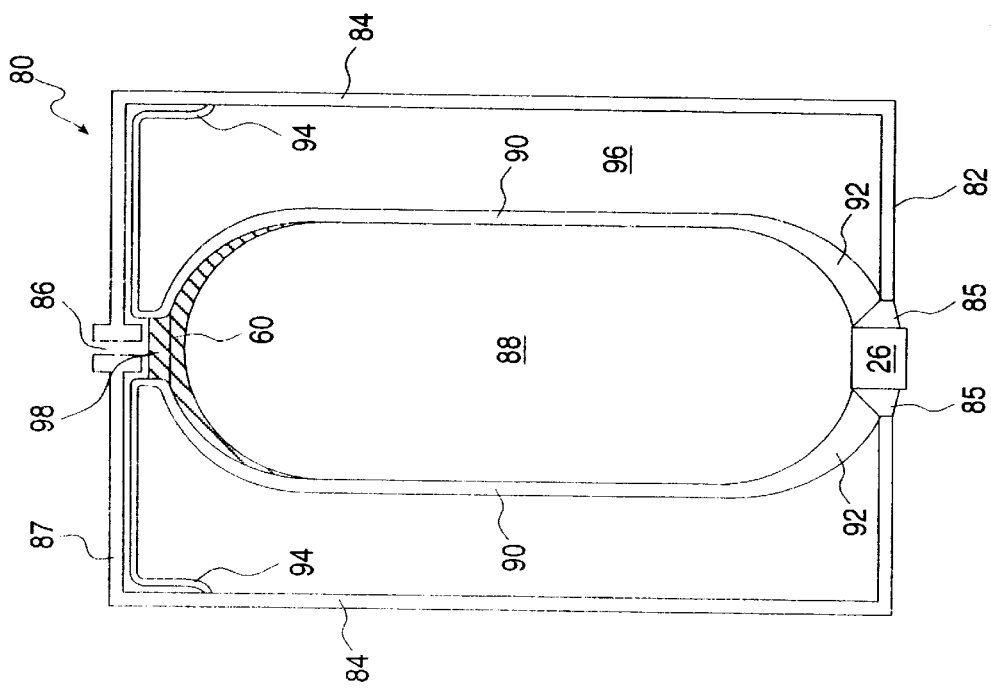
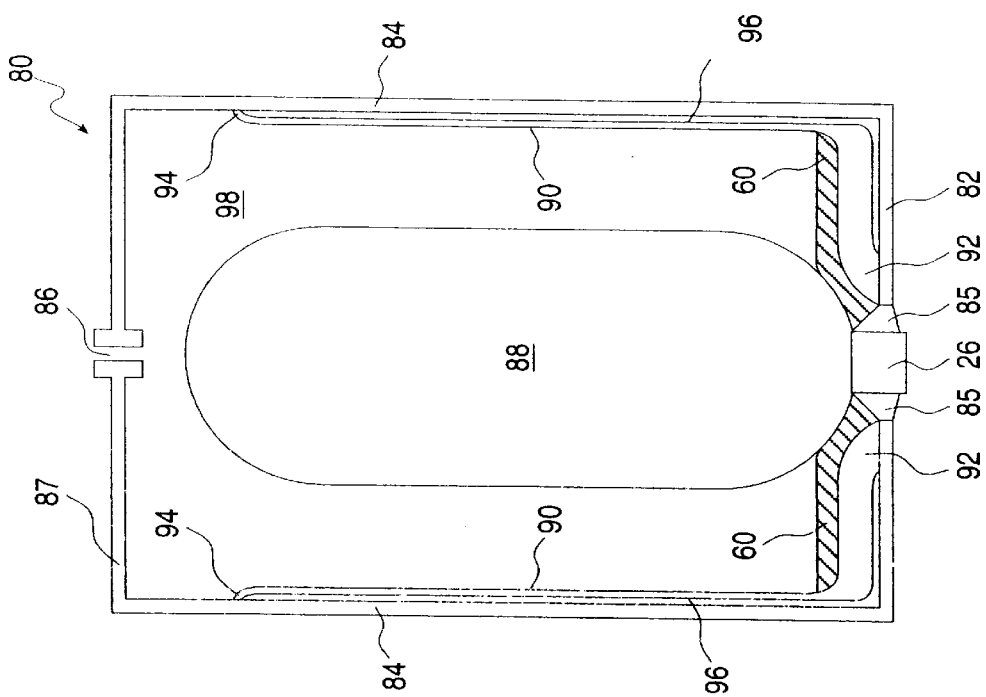

METHODS FOR MANUFACTURE OF REINFORCED COMPOSITE VESSEL

FIELD AND BACKGROUND OF THE INVENTION

The present invention relates to a reinforced composite vessel and, more particularly, to a vessel of improved design and an improved method for its manufacture.

Filament winding long has been used to manufacture reinforced composite vessels. A general review of the state of the art may be found in W. D. Humphrey and S. T. Peters, "Filament Winding", *Concise Encyclopedia of Composite Materials* (Kelly Anthony, editor), Pergamon Press, 1994, pp. 368–377, which is incorporated by reference for all purposes as if fully set forth herein. Briefly, one or more strands composed of many filaments of a material such as fiberglass are impregnated with a liquid resin binder and wrapped around a mandrel, and the wrapped mandrel is cured to polymerize the binder. Typically, a cylindrical mandrel is rotated about its axis and a strand delivery system is translated parallel to the mandrel axis to produce a helical wrapping pattern. Most often, one strand, or a band of several adjacent strands, is used to wrap a mandrel supported externally at two ends, as illustrated in FIG. 1 of Humphrey and Peters. Known variations of the process include:

1. Wrapping the mandrel with one or more dry strands, followed by coating the wrapped mandrel with the liquid resin binder. See, for example, U.S. Pat. No. 3,210,228, to Bluck.

2. Simultaneously wrapping the mandrel with several strands delivered from a plurality of ports disposed circumferentially around the mandrel, as taught for example in U.S. Pat. No. 3,255,976, to Mede, and in European Patent Application 0 370 109, both of which are incorporated by reference for all purposes as if fully set forth herein.

Conventionally, the mandrel is supported horizontally and externally at both ends. A notable exception is the above-referenced U.S. Pat. No. 3,255,976, which describes the wrapping of a vertical mandrel, supported from below, to produce a rocket motor casing.

The term "strand" is used herein as in U.S. Pat. No. 3,282,757, to Brussee, to denote individual filaments, of any shape, as well as rovings, flat bands, ribbons and the like which may be made up either as integral members or of a plurality of filaments. The material laid down on the mandrel in one translational pass of the mandrel past the strand delivery system is denoted herein a "stroke".

Several aspects of the filament winding process are susceptible to improvement. When several strands are used to wrap the mandrel, it is necessary to interrupt the winding process at the end of each stroke, to anchor the strands to the mandrel. The dry-wrapping process has several advantages: the resin binder of inner strokes does not begin to cure while the outer strokes are being applied; and the strands can be impregnated in a restricted space with less waste of excess binder and fewer emissions of solvent vapors; but if the resin is applied to dry strands after the winding process has been completed, care must be taken to ensure that the resin does not include dissolved gases that could produce voids in the cured resin, and to ensure that the resin coats all the strands uniformly. Because relatively small amounts of catalyst are used to polymerize the resin, care also must be taken to make sure that the catalyst is mixed uniformly with the resin.

Another problem endemic to prior art reinforced composite vessels is the phenomenon of "basket weave". This is described by D. T. Jones, I. A. Jones and V. Middleton in "Improving composite lay-up for non-spherical filament-wound pressure vessels", Composites: Part A, Vol. 27A pp. 311–317, which article is incorporated by reference for all purposes as if fully set forth herein, as "where successive fibres overlap each other and a laminate structure is formed containing large voids since discrete areas are not covered". Jones, Jones and Middleton propose a single roving winding strategy that reduces basket weave.

There is thus a widely recognized need for, and it would be highly advantageous to have, an improved filament winding process for manufacturing a reinforced composite vessel.

SUMMARY OF THE INVENTION

According to the present invention there is provided a method for wrapping a mandrel having a cylindrical body and a convex, cylindrically symmetrical cap, the cap having an apex, including the steps of: (a) feeding at least two strands towards the mandrel from ports positioned at substantially equal azimuthal intervals around the mandrel; (b) simultaneously: (i) translating the mandrel with respect to the ports in a first axial direction so that the apex of the cap approaches the ports, and (ii) rotating the mandrel with respect to the ports in a certain azimuthal direction; and (c) simultaneously: (i) translating the mandrel axially with respect to the ports in a direction opposite to the first axial direction, and (ii) continuing to rotate the mandrel with respect to the ports in the certain azimuthal direction, causing portions of the at least two strands to mutually overlap, thereby anchoring the at least two strands on the cap.

According to the present invention there is provided a reinforced vessel including at least two reinforcing strands disposed in at least one pair of helical strokes, each of the strokes having a cylindrical portion and a convergent portion; for each of the at least one pair of helical strokes, the at least two strands mutually overlapping in the convergent portion of a first of the each pair of helical strokes and in the convergent portion of a second of the each pair of helical strokes.

According to the present invention there is provided a method for preparing a liquid binder for making a reinforced vessel, including the steps of: (a) placing the liquid binder in a flexible container; (b) sealing the flexible container; (c) inserting the sealed flexible container in a rigid chamber; (d) securing two ends of the flexible container to opposite interior walls of the rigid chamber; and (e) depressurizing the rigid chamber, thereby causing the sealed flexible container to expand within the rigid chamber.

According to the present invention there is provided a method for producing a reinforced vessel, including the steps of: (a) wrapping at least one reinforcing strand around a mandrel having a first end and a second end, thereby creating a wrapped mandrel; and (b) causing a volume of liquid binder sufficient to coat substantially all of the wrapped mandrel to sweep annularly past the wrapped mandrel from the first end to the second end.

According to the present invention there is provided an apparatus for producing a reinforced vessel, including: (a) a mandrel having a longitudinal axis; (b) at least one strand port for applying a reinforcing strand to the mandrel, the at least one strand having a proximal end; (c) for each of the at least one strand port, a mechanism, at the proximal end, for preventing damage and distortion of the strand as the strand is applied to the mandrel; and (d) for each of the at least one strand port, a mechanism for changing a distance between the proximal end of the each at least one strand port and the longitudinal axis of the mandrel.

According to the present invention there is provided an apparatus for producing a reinforced vessel, including: (a) a mandrel having a proximal end, a distal end and a longitudinal axis; (b) a mechanism for supporting the mandrel, the support being external only at the proximal end and internal at the distal end; (c) a mechanism for rotating the mandrel about the longitudinal axis; (d) a strand delivery system for delivering at least one strand to the mandrel; and (e) a mechanism for translating the mandrel relative to the strand delivery system and parallel to the longitudinal axis; the strand delivery system, the mechanism for rotating the mandrel and the mechanism for translating the mandrel cooperating to wrap the at least one strand around the mandrel.

According to the present invention there is provided a method for producing a reinforced vessel, including the steps of: (a) providing a winding apparatus including: (i) a mandrel having a proximal end, a distal cap and a longitudinal axis, the mandrel being supported externally only at the proximal end, the distal cap including an apex, and (ii) a plurality of ports, each of the ports for delivering a strand to the mandrel, the ports being disposed circumferentially around the longitudinal axis; (b) tying the strands together at the longitudinal axis, external to the mandrel, thereby forming a first knot; (c) positioning the mandrel with the apex touching the first knot; (d) translating the mandrel relative to the ports to apply the strands to the distal cap; (e) wrapping the mandrel with the strands by translating and rotating the mandrel relative to the ports, the ports being adjacent to the apex when the wrapping is finished; and (f) translating the mandrel away from the ports while rotating the mandrel, thereby forming a rope of the strands emerging from the apex.

According to the present invention there is provided a method for producing a reinforced vessel, including the steps of: (a) determining a wrapping protocol for wrapping a mandrel with a plurality of strokes of at least one strand, the wrapping protocol including a strand tension as a function of at least one kinematic parameter; and (b) wrapping the mandrel with the plurality of strokes according to the wrapping protocol.

The mandrel used for filament wrapping according to the present invention is a flexible, internally supported mandrel that is held to the desired shape by internal pressurization, most conveniently by pressurized air. The mandrel is supported externally only at its proximal end and internally also at its distal end. The mandrel includes a cylindrical body portion and two convex, cylindrically symmetrical caps. The present invention is applicable to mandrels with caps of any shape that satisfies these two conditions, for example, toroidal caps. The illustrative examples presented herein are of the special case of hemispherical caps. In these examples, the cap at the proximal end of the mandrel, where the mandrel is supported, spans only part of a hemisphere; the cap at the opposite, distal end spans a full hemisphere.

The mandrel is translated and rotated past a strand delivery system that delivers strands for wrapping the mandrel from ports disposed circumferentially around the mandrel. Each port is provided with a mechanism to ensure that the strand delivered therefrom is laid flat and undamaged onto the mandrel. As the body portion of the mandrel passes the strand delivery system, the strands of any particular stroke are laid down on the mandrel in a helical pattern. As a hemispherical cap of the mandrel passes the strand delivery system, the strands continue to be laid down on the cap, and converge towards the mandrel axis. When the strands reach a point of closest approach to the mandrel axis, the translational motion of the mandrel is reversed, while the rotational motion of the mandrel continues. The strands now mutually overlap, forming a ring that anchors the strands in place on the cap. As the reversed translation of the mandrel continues, the strands continue to be laid down on the mandrel, forming the next stroke. Because the strands are self-anchored on the cap, there is no need to interrupt the wrapping process to tie down or otherwise anchor the strands on the cap. Furthermore, the anchoring allows greater deviations from exact geodesics than would otherwise be possible. This allows the strands to be laid down at different winding angles on the mandrel caps than on the mandrel body. So, for example, successive strokes can be laid down on the mandrel caps at a series of winding angles, to give the caps uniform thickness, while being laid down on the mandrel body at a uniform winding angle for more compact and uniform coverage. The scope of the present invention includes the reinforced vessels thus manufactured.

The liquid binder is prepared for application to the wrapped mandrel by being placed in a flexible container, along with small dense objects such as metal balls to promote the mixing of the binder. The container is sealed and placed in a rigid airtight chamber, with two ends of the container secured to opposite ends of the chamber. The chamber is closed and evacuated. The flexible container expands to fill the chamber, with the liquid binder occupying the bottom of the container and a region of partial vacuum occupying the top of the container. The chamber is agitated, to promote the mixing of the binder. The chamber also is tilted to maximize the area of the interface between the binder and the partial vacuum, thus promoting further release of dissolved gases from the binder.

The wrapped mandrel is placed vertically inside a coating chamber, along with an amount of binder sufficient to coat the mandrel. The coating chamber is constructed so that the volume enclosing the mandrel and the binder may be varied. For example, the mandrel and the binder may be placed within a flexible annular sleeve, or the chamber may have an upper and a lower portion connected by a bellows. The volume enclosing the mandrel and the binder is reduced to force the binder to sweep annularly from the lower end of the mandrel to the upper end of the mandrel. Subsequent operations, such as cyclically pressurizing and depressurizing the space between the outer and inner walls, vibrating the mandrel, and increasing the pressure in the mandrel, serve to distribute the binder uniformly around the strands and to cause the strands to move so that the tension therein is distributed uniformly. The mandrel then is heated internally to cure the binder.

BRIEF DESCRIPTION OF THE DRAWINGS

The invention is herein described, by way of example only, with reference to the accompanying drawings, wherein:

FIG. 1A is a side view of a filament winding apparatus;

FIG. 1C is a longitudinal cross-section of the mandrel of the filament winding apparatus of FIG. 1A;

FIGS. 8A and 8B show two stages in the process of coating a wrapped mandrel with a liquid binder;

DESCRIPTION OF THE PREFERRED EMBODIMENTS

The present invention is of an improved method for manufacturing reinforced composite vessels by filament winding, and of the vessels so manufactured.

The principles of filament winding according to the present invention may be better understood with reference to the drawings and the accompanying description.

Figure 1B:
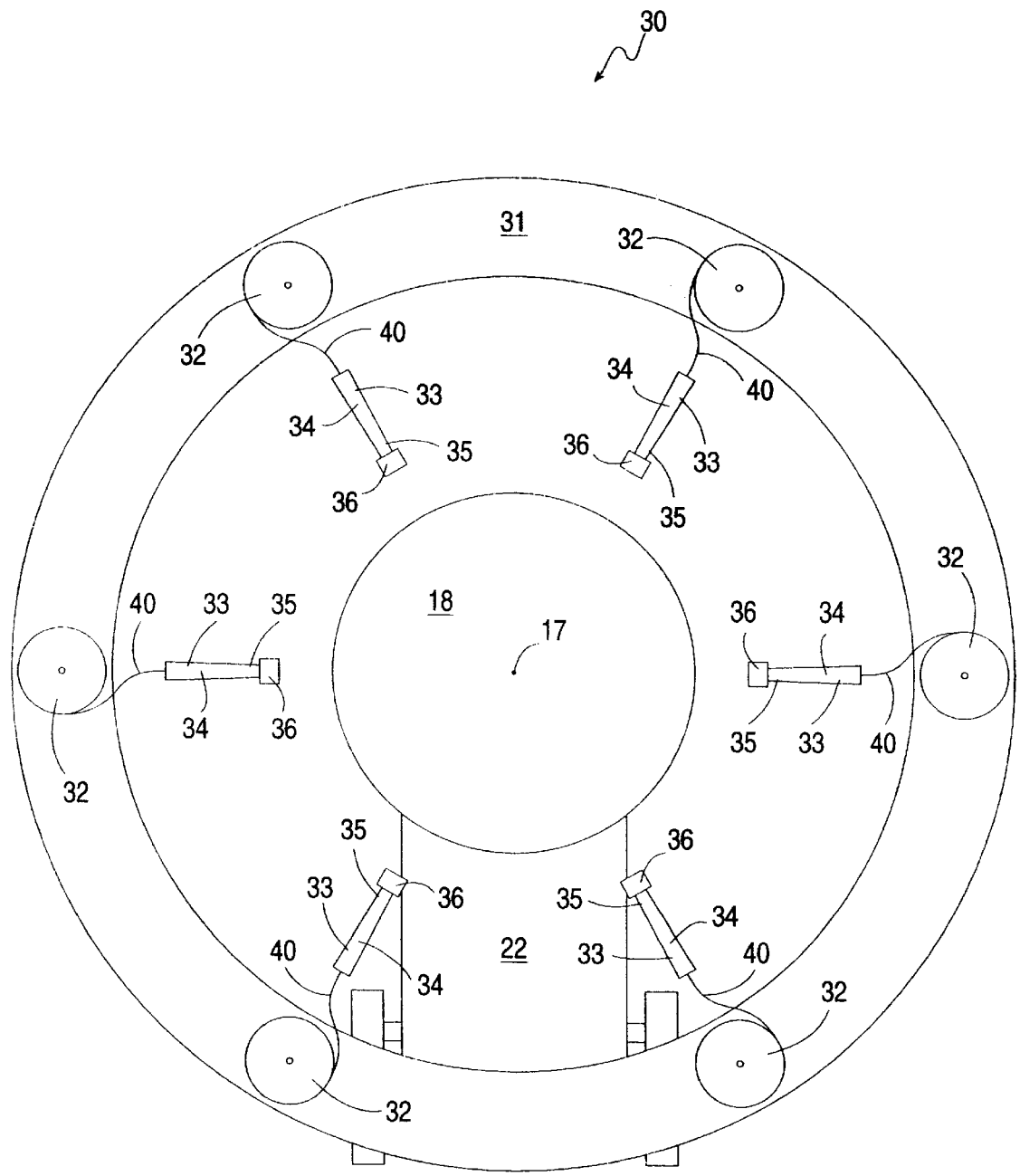
FIG. 1B is an end view of the filament winding apparatus of FIG. 1A.

Referring now to the drawings, FIG. 1A and 1B are partly schematic illustrations of a filament winding apparatus 10 of the present invention. FIG. 1A is a side view of apparatus 10. FIG. 1B is an end view of apparatus 10 from the distal end thereof. An internally supported mandrel 12 is attached by a chuck 26 on a proximal end 15 of mandrel 12 to a shaft 24 of a motor 20. Mandrel 12 has a flexible outer skin, which is held in the shape shown by internal pressure provided by blowing compressed air into mandrel 12 via chuck 26. Mandrel 12 has three sections: a proximal cap 16, a cylindrical body 14, and a distal cap 18 whose apex 17 is the distal end of mandrel 12. Cap 18 is hemispherical in shape. Cap 16 also is hemispherical in shape, but is truncated where chuck 26 attaches to the rest of mandrel 12. Motor 20 rides on a carriage 22. Motor 20 is used to rotate mandrel 12 about longitudinal axis 11 thereof (clockwise or counterclockwise as seen in FIG. 1B). Carriage 22 is used to translate mandrel 12 parallel to longitudinal axis 11 (left and right as seen in FIG. 1A).

A strand delivery system 30, based on an annular frame 31 that is substantially concentric with mandrel 12, is provided for delivering strands 40 from bobbins 32 to mandrel 12. Strands 40 are delivered via strand ports 34 that are spaced equally and circumferentially around mandrel 12. Each bobbin-port combination is provided with a mechanism (not shown) for applying the proper degree of tension to strand 40, with the object of producing a reinforced vessel in which all strands 40 are under uniform tension.

The proper degree of tension to apply is determined experimentally. Load cells are placed at selected locations on the surface of mandrel 12. Mandrel 12 is wrapped with a first stroke, with somewhat more tension applied to strands 40 than the minimum needed to keep strands 40 straight and in place. The loads measured by the load cells are recorded. If subsequent strokes were applied with the same tension on strands 40 as in the first stroke, the pressure of the outer strokes would relax some of the tension on strands 40 of the first stroke. In order to prevent excessive reduction of the tension of the first stroke, the tension applied to strands 40 of subsequent strokes is reduced enough to keep the loads measured by the load cells constant. The tension applied to strands 40 in the wrapping of the first stroke is selected so that the tension applied to strands 40 in the wrapping of the last stroke is just enough to keep strands 40 straight and in place. These tensions generally are in the range of 3 to 10 Newtons.

These tensions constitute a wrapping protocol, as a function of stroke number and winding angle α (see FIGS. 4 and 5 below), for wrapping mandrel 12 in the subsequent production of reinforced vessels. During this subsequent production, the tensioning mechanisms are controlled in accordance with stroke number and winding angle. Note that unlike tension, which is a dynamic parameter, stroke number and winding angle are kinematic parameters: they define the positions of strands 40 without explicit reference to the forces on strand 40. In this way, mandrel 12 is wrapped without explicit feedback of the tension actually applied to strands 40.

The degree of tension required in the strands of the final vessel is obtained by inflating mandrel 12 to preload strands 40, after the mandrel wrapping has been impregnated with the resin binder but before the binder cures and hardens. In this way, strands 40 are provided with a uniform tension and are redistributed slightly in a more compact distribution than would otherwise be possible.

Each strand port 34 has a distal end 33, wherethrough strand 40 enters strand port 34, and a proximal end 35, wherethrough strand 40 exits strand port 34. Each strand port 34 also is provided with a mechanism 36 for assuring that strand 40 is applied flat and undamaged to mandrel 12. For simplicity, only six strands 40 and associated delivery mechanisms are shown. In practice, between 40 and 160 strands 40 are delivered simultaneously to mandrel 12.

FIG. 1C is a longitudinal cross section of mandrel 12 showing how mandrel 12 is supported externally and internally. At proximal end 15, mandrel 12 is supported externally by chuck 26. An extension 25 of shaft 24 extends to distal end 18 and terminates in a disk 27. Another disk 29 is rigidly fixed to the inner wall of mandrel 12 at apex 17. Disk 27 is reversibly secured to disk 29, for example by bolts, to support apex 17 internally. This support arrangement allows shaft 24 and shaft extension 25 to be used with mandrels 12 of varying length.

Figures 2A, 2B:
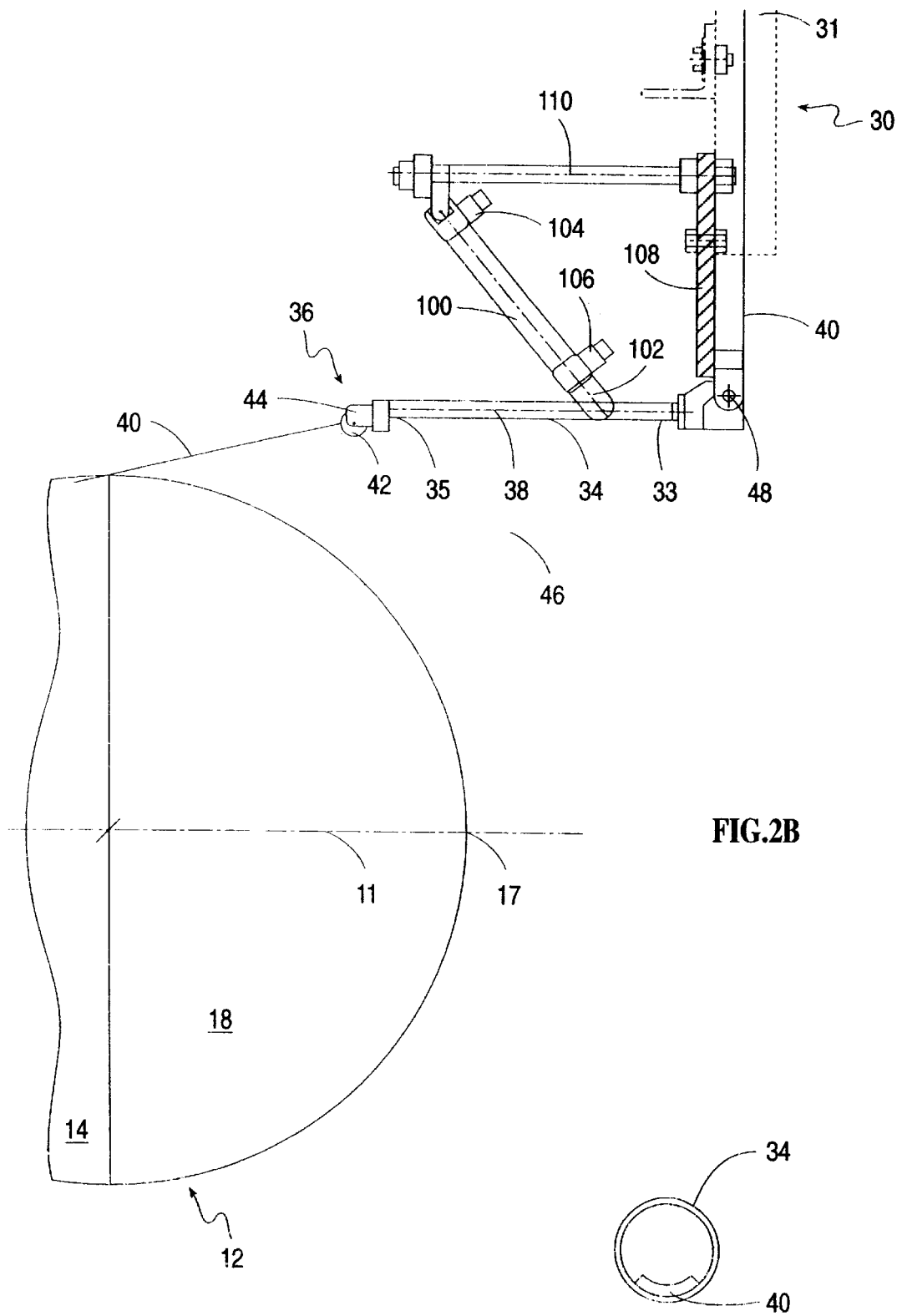
FIG. 2A (prior art) illustrates the bending of a strand by a delivery port.
FIGS. 2B and 2C illustrate a mechanism for counteracting the bending illustrated in FIG. 2A.

FIG. 2A illustrates the problem addressed by mechanism 36. FIG. 2A shows one of strand ports 34 in cross section, at proximal end 35 thereof. Strand port 34 is cylindrical in internal cross section. Strand 40, of up to 2000 individual filaments, is rectangular in cross section as delivered from bobbin 32, but the tension applied to strand 40 in the course of delivering strand 40 to mandrel 12 combines with the cylindrical internal cross section of strand port 34 to give strand 40 a lunate cross section as shown in FIG. 2A. In addition, depending on the relative orientations of mandrel 12 and strand port 34, strand 40 may bend sharply upon emerging from strand port 40, damaging strand 40 by breaking small particles off of strand 40, thereby weakening strand 40 and contaminating the mandrel wrapping with foreign matter that does not contribute to the mechanical strength of the final vessel.

FIG. 2B shows a preferred mechanism 36 for delivering strands 40 flat to mandrel 12, and also a mechanism for varying the distance between proximal ends 35 and longitudinal axis 11 to enable the accurate placement of strands 40 on caps 16 and 18. For simplicity, only one strand port 34 is shown in FIG. 2B. Rigidly attached to frame 31 are a radial arm 108 and an axial arm 110. Strand port 34 is pivotably attached at distal end 33 to radial arm 40 via a hinge 48. A pneumatic cylinder 100 is provided to connect strand port 34 to axial arm 110: one end of pneumatic cylinder 100 is pivotably attached to axial arm 110; from the other end of pneumatic cylinder 100 emerges a rod 102 that is pivotably attached at one end to strand port 34 near distal end 33. The other end of rod 102, within cylinder 100, is provided with a piston (not shown). Cylinder 100 is provided with two fluid ports 104 and 106 wherethrough a pneumatic fluid, preferably air, is introduced under pressure or withdrawn, to slide rod 102 within cylinder 100 via the differential pressure of the fluid on the piston. As rod 102 slides outward, the angle between longitudinal axes 11 and 38 is increased and proximal end 35 of strand port 34 is moved towards longitudinal axis 11. Mechanism 36 includes a ring 46 that is free to rotate about longitudinal axis 38 of strand port 34. Rigidly attached to ring 46 is a bracket 44. A cylindrical roller 42 is mounted in bracket 44 to rotate freely about an axis perpendicular to axis 38. Another cylindrical roller (not shown) at distal end 33 rotates freely about an axis parallel to hinge 48 and guides strand 40 into strand port 34. The cylindrical shapes of roller 42 and the roller at distal end 33, the pivoting of strand port 34 about hinge 48, the freedom of ring 46 to rotate about axis 38, and the tension on strand 40 combine to preserve the rectangular cross section of strand 40 and to prevent the formation of sharp bends in strand 40 as strand 40 traverses strand port 34.

Alternatively, cylinder 100 is a hydraulic cylinder, and strand port 34 is moved by introducing hydraulic fluid to cylinder 100 and withdrawing hydraulic fluid from cylinder 100 via fluid ports 104 and 106.

Figure 2C:
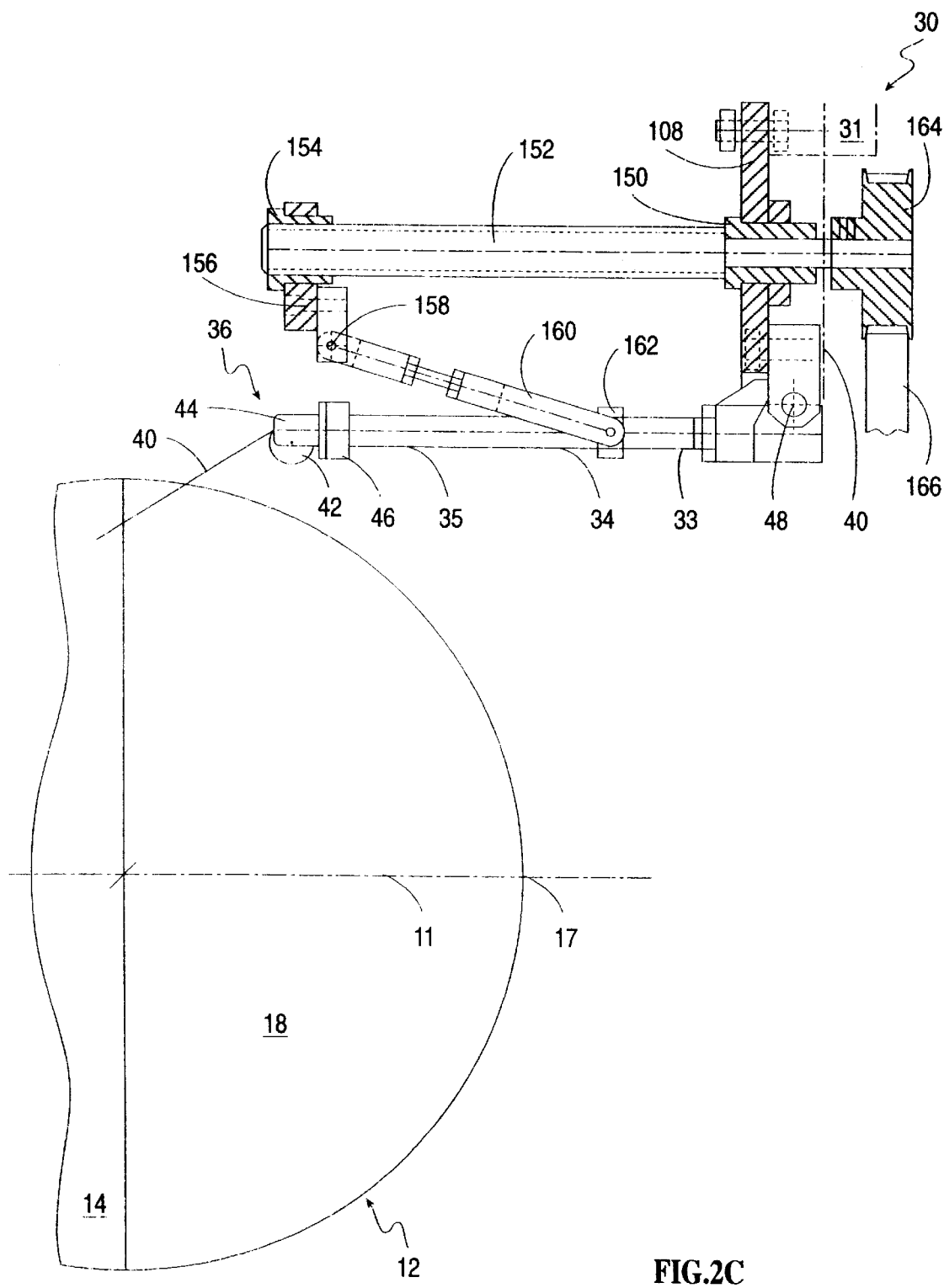

FIG. 2C shows a variant of the mechanism of FIG. 2A. In the variant of FIG. 2C, radial arm 108 is provided with a bushing 150 through which runs a horizontal threaded screw pin 152. Screw pin 152 is threaded into a nut 154 which is attached, via a fitting 156 and a pivot 158, to a rod 160, which is in turn pivotably connected to a ring 162 that is free to slide along strand port 34. The end of screw pin 152 on the other side of bushing 150 from nut 154 is attached to a timing belt pulley 164 that is driven by an electrical motor (not shown) by means of a timing belt 166. As nut 154 is moved rightward by the rotation of screw pin 152, rod 160 forces proximal end 35 of strand port 34 towards longitudinal axis 11. If it is not necessary for strand ports 34 to move independently, then fitting 156 is a ring that is concentric with longitudinal axis 11 and to which are attached many fewer nuts 154 than there are strand ports 34, although all rods 160 are pivotably attached to ring 156 via pivots 158. In principle, as few as only two screw pins 152 and nuts 154 are needed in the latter configuration.

Figure 3:
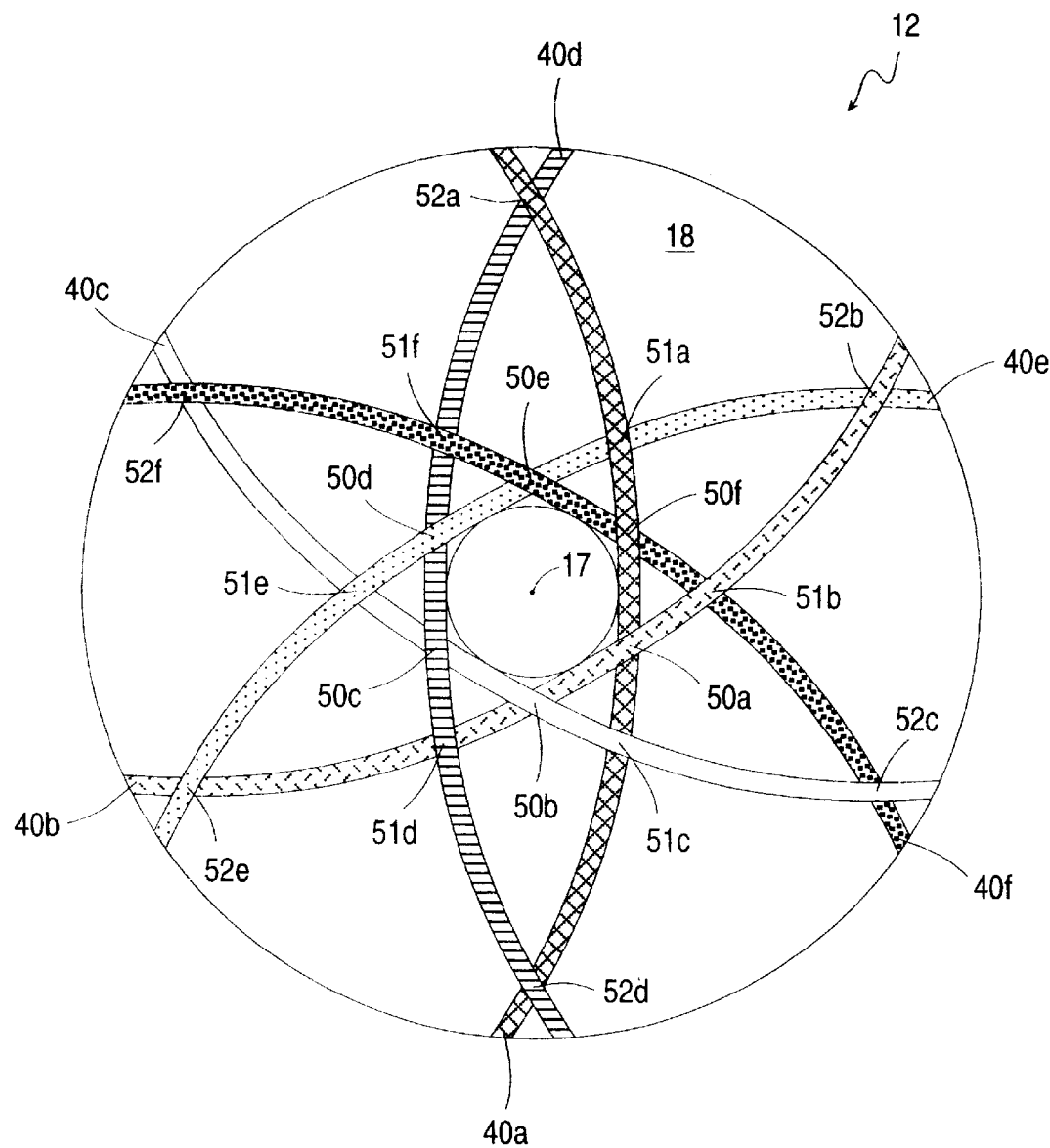
FIG. 3 is an end view of a hemispherical cap wrapped with six strands.

FIG. 3 illustrates how a self-anchoring ring is formed on hemispherical cap 18 by six strands 40*a* through 40*f*. FIG. 3 is drawn in the coordinate frame of mandrel 12, so to properly understand FIG. 3, strand delivery system 30 should be visualized as initially translating out of the plane of FIG. 3 while rotating counterclockwise. This is equivalent to mandrel 12 translating leftward as seen in FIG. 1A while rotating clockwise as seen in FIG. 1B. When strand delivery system 30 reaches hemispherical cap 18, strands 40*a* through 40*f* start to be laid down on hemispherical cap 18, and also start to approach each other. When strands 40*a* through 40*f* reach their closest approach to apex 17, the translational motion of mandrel 12 is reversed, so that delivery system 30 now moves into the plane of FIG. 3, while the rotational motion of mandrel 12 relative to delivery system 30 continues as before. Shortly afterwards, strands 40*a* through 40*f* meet and the following happens simultaneously: Strand 40*b* covers strand 40*a* at overlap 50*a*; strand 40*c* covers strand 40*b* at overlap 50*b*; strand 40*d* covers strand 40*c* at overlap 50*c*; strand 40*e* covers strand 40*d* at overlap 50*d*; strand 40*f* covers strand 40*e* at overlap 50*e*; and strand 40*a* covers strand 40*f* at overlap 50*f*. As strand delivery system 30 continues to move into the plane of FIG. 3, the following happens simultaneously: Strand 40*a* covers strand 40*e* at overlap 51*a*; strand 40*b* covers strand 40*f* at overlap 51*b*; strand 40*c* covers strand 40*a* at overlap 51*c*; strand 40*d* covers strand 40*b* at overlap 51*d*; strand 40*e* covers strand 40*c* at overlap 51*e*; and strand 40*f* covers strand 40*d* at overlap 51*f*. Overlaps 50*a* through 50*f* and 51*a* through 51*f* constitute a self-anchoring ring that anchors strands 40*a* through 40*f* to hemispherical cap 18. As strand delivery system 30 continues to move still deeper into the plane of FIG. 3, the following happens simultaneously: Strand 40*a* covers strand 40*d* at overlap 52*a*, strand 40*b* covers strand 40*e* at overlap 52*b*, strand 40*c* covers strand 40*f* at overlap 52*c*, strand 40*d* covers strand 40*a* at overlap 52*d*, strand 40*e* covers strand 40*b* at overlap 52*e* and strand 40*f* covers strand 40*c* at overlap 52*f*. Overlaps 52*a* through 52*f* provide additional anchoring of strands 40*a* through 40*f* to hemispherical cap 18. As in FIG. 1B, only six strands are shown in FIG. 3 for clarity. In order for strands 40 to mutually overlap and anchor each other to hemispherical cap 18 as strand delivery system 30 translates and rotates past hemispherical cap 18, it suffices that there be at least two strands 40 in each stroke. For example, in FIG. 3, strands 40*a* and 40*d* anchor each other at overlaps 52*a* and 52*d*. Note, however, that two strands 40 anchor each other well into the departure of mandrel 12 from strand delivery system 30. The more strands 40 per stroke, the sooner and more strongly strands 40 anchor each other as mandrel 12 approaches strand delivery system 30. As noted above, in practice between 40 and 160 strands 40 are used. With that many strands, the corresponding self-anchoring ring appears much more like a circular annulus, concentric with longitudinal axis 11 of mandrel 12, than the self-anchoring ring shown in FIG. 3.

Figure 4:
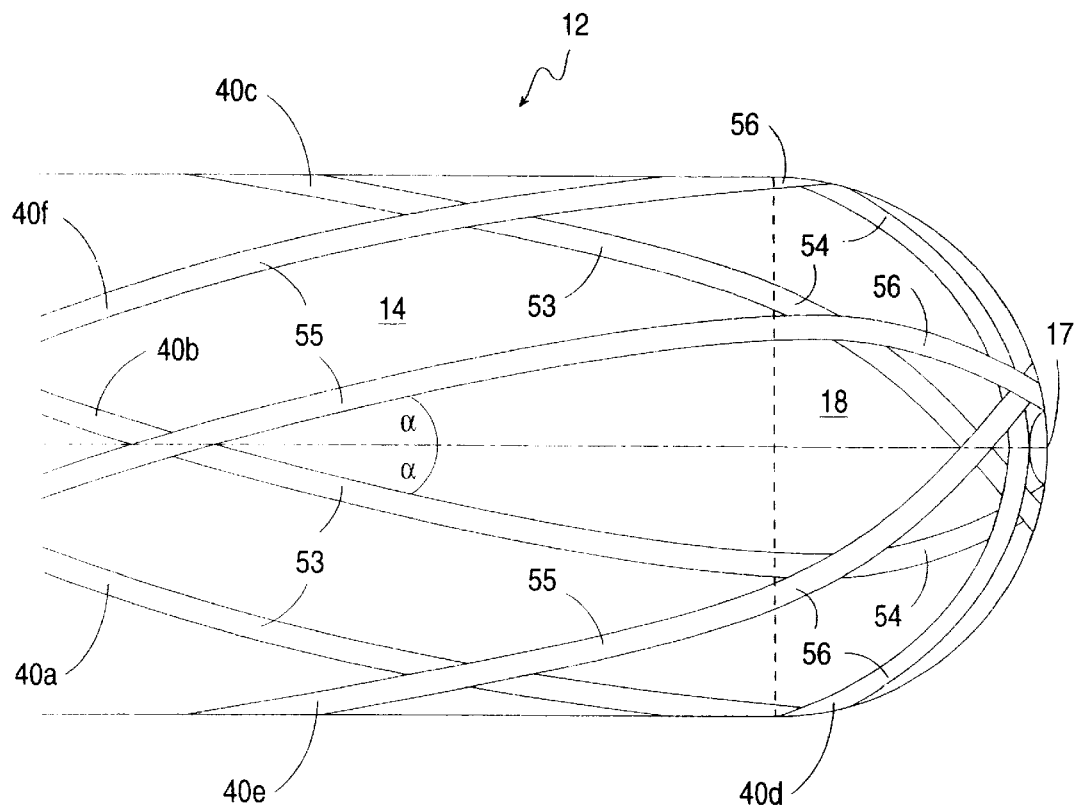
FIG. 4 is a partial side view of a mandrel wrapped as in FIG. 3.

Strands 40*a* through 40*f*, on their approach to distal end 17 of mandrel 12, are part of a spherically convergent portion 54 of a lower stroke. Similarly, strands 40*a* through 40*f*, on their departure from distal end 17 of mandrel 12, are part of a spherically divergent portion 56 of an upper stroke. FIG. 4 shows the right hand portion of mandrel 12, as seen in FIG. 1A, wrapped in the manner of FIG. 3. In FIG. 4, both helical portion 53 and spherically convergent portion 54 of the lower stroke are visible, as are both helical portion 55 and spherically divergent portion 56 of the upper stroke. Structurally, however, both portions 54 and 56 are spherically convergent, in the sense that they both converge from helical portions 53 and 55, respectively, towards apex 17. As noted above, the scope of the present invention includes all reinforced composite vessels incorporating a strand structure of this type, with a lower stroke and an upper stroke connected by self-anchoring strands.

Note that all strands in spherically divergent portion 56 cover all strands in spherically convergent portion 54. As a result, the reinforced composite vessels of the present invention suffer considerably less from basket weave than the vessels of the prior art that are wound using a single strand or a band of adjacent strands. For example, in FIG. 9 of Jones et al., basket weave appears clearly on the dome end (corresponding to distal end 18) of a cylindrical vessel, in the form of a stairstep structure. Such structures are absent in reinforced composite vessels of the present invention.

When the translational motion of mandrel 12 brings hemispherical cap 16 to strand delivery system 30, hemispherical cap 16 is wrapped in the same manner as hemispherical cap 18. The only difference between the wrapping of cap 16 and cap 18 is that the presence of chuck 26 places a lower bound on the allowable diameter of the self-anchoring ring formed on cap 16.

FIG. 4 shows strands 40a through 40f wrapping mandrel 12 at the same angle α with respect to longitudinal axis 11 of mandrel 12 on both the approach to cap 18 and the departure from cap 18. This angle is determined by the ratio of the translational speed of mandrel 12 to the rotational speed of mandrel 12. It is preferable that the same winding angle be maintained for several strokes so that body 14 of mandrel 12 can be wrapped evenly and uniformly with minimal basket weave. This constant winding angle corresponds to applying strands 40 to mandrel 12 along geodesics. If the same winding angle were maintained in cap 18, then all the fiber rings would have the same radius, and the wrapping of cap 18 would not have a uniform thickness. To provide the reinforced vessel with a desired geometry at cap 18, for example, a uniform thickness if cap 18 is hemispherical as illustrated, the various fiber rings must have different radii, that increase as the stroke number increases. Therefore, strands 40 are not applied to cap 18 exactly along geodesics.

Figure 5:
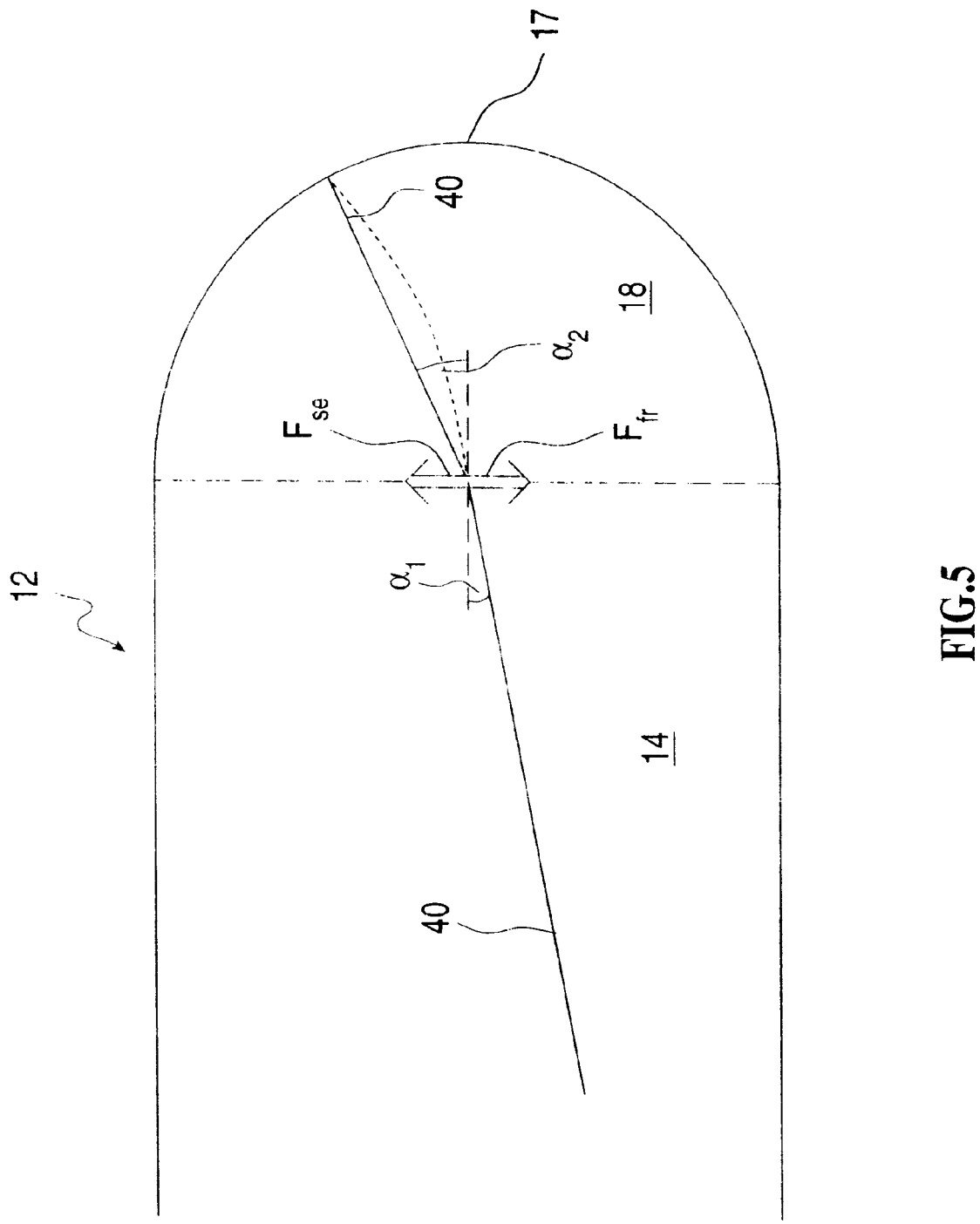
FIG. 5 illustrates the wrapping of the cylindrical body and the spherical cap of a mandrel at two different angles relative to the mandrel's longitudinal axis.

Part of this deviation from geodesic paths is allowed by the friction between strands 40 and the surface of mandrel 12, and by the friction between strands 40 of different strokes. This is illustrated in FIG. 5, which shows a strand 40 making an angle $\alpha_1$ with longitudinal axis 11 of mandrel 12 on body portion 14 and a different angle $\alpha_2$ with longitudinal axis 11 of mandrel 12 on hemispherical cap 18. The tension in strand 40 creates a slippage force $F_{sl}$ which tends to make $\alpha_1$ and $\alpha_2$ equal. This slippage force is opposed by a frictional force $F_{fr}$ that depends on the coefficient of friction between strand 40 and the surface of mandrel 12 and on the force (resulting from the tension in strand 40) that pushes strand 40 against mandrel 12. There is a range of angles $\alpha_1$ and $\alpha_2$ for which $F_{sl}<F_{fr}$, so that strand 40 remains anchored as shown on the boundary between body 14 and cap 18 (represented by a vertical line). In practice, α does not change abruptly at the boundary between body 14 and cap 18. The path actually followed by strand 40, and characterized by a smoothly varying α, is indicated in FIG. 5 by the dotted line. Strand 40 reaches the same position on cap 18, at the closest approach of strand 40 to apex 17, that strand 40 would have reached had α actually changed abruptly at the boundary between body 14 and cap 18, so $\alpha_2$ is an effective winding angle on cap 18.

This freedom to depart from strict geodesics is enhanced by the mutual anchoring of strands 40 on cap 18. The higher the number of strands 40 applied simultaneously to mandrel 12, the sooner in the application of strands 40 to cap 18 does this anchoring begin, both because of the geometric considerations, illustrated above in connection with FIG. 3, which would apply even to infinitesimally thin strands, and because strands 40 of finite width actually contact each other while mandrel 12 is still approaching strand delivery system 30.

Figure 12A:
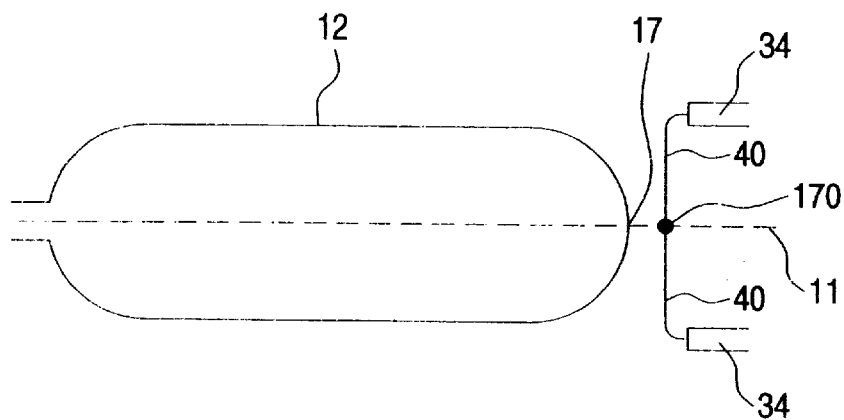
FIGS. 12A and 12B are partial illustrations of the filament winding apparatus at two stages at the beginning of mandrel wrapping.
Figure 12B:
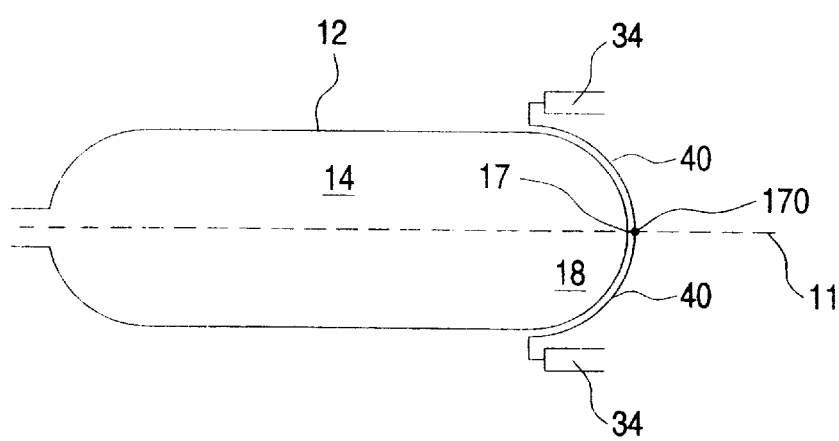
Figure 12C:
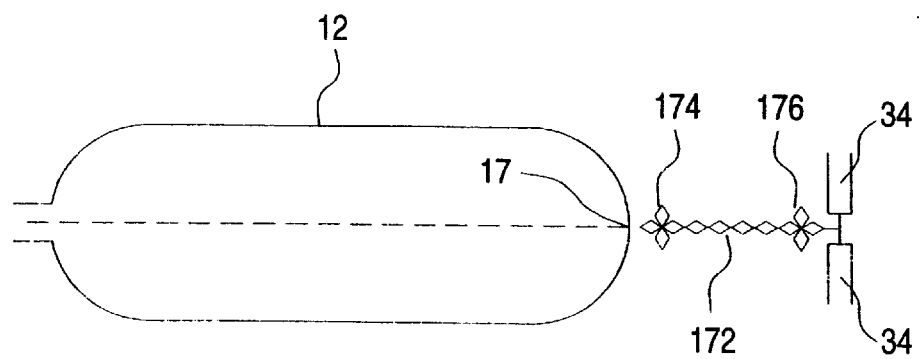
FIG. 12C is a partial illustration of the filament winding apparatus at the end of mandrel wrapping.

FIGS. 12A through 12C illustrate the start and end of the wrapping process. FIG. 12A is a partial depiction of winding apparatus 10 immediately prior to the wrapping of mandrel 12 with strands 40. Strands 40 are tied in a knot 170 adjacent to apex 17. FIG. 12B shows the beginning of the wrapping process. Mandrel 12 is translated rightward without rotation so that strands 40 lie on distal cap 18, from apex 17 at least part of the way to the boundary between distal cap 18 and body 14. Now, mandrel 12 is translated rightward and rotated simultaneously to wrap body 14 with strands 40 at a small angle α. As discussed above, the friction between strands 20 and mandrel 12 allows α to be changed from 0° on cap 18 to a small, non-zero value on body 14 without slippage. A stroke such as this, with strands nearly parallel to longitudinal axis 11 of mandrel 12, provides longitudinal strength to the final reinforced composite vessel. Subsequent strokes may be applied at larger values of α, the largest value being that at which neighboring strands 40 are adjacent. Such a stroke, with strands nearly perpendicular to longitudinal axis 11 of mandrel 12, provides transverse strength to the final reinforced vessel. Note that the inner strokes also must depart from strict geodesic geometry on cylindrical body 14, in order to clear chuck 26 on cap 16.

FIG. 12C shows the end of the wrapping process. Strand ports 34 are brought together at apex 17. Mandrel 12 is translated leftward and rotated to twist strands 40 into a helical rope 172. Rope 172 is tied off with a knot 174 at apex 17 and with a knot 176 at strand ports 34 and cut in-between knots 174 and 176. Knot 174 at apex 17 finishes the wrapping process. Knot 176 at strand ports 34 serves as knot 170 for wrapping the next mandrel 12 to create the next vessel.

As noted above, the successive values of α are chosen in a way that produces a spacing of fiber rings on caps 16 and 18 such that the hemispherical caps of the reinforced vessel thus produced are of uniform thickness. In this way, the strength of the vessel is optimized relative to the amount of winding material used. In the case of a vessel with toroidal caps, the successive values of α are chosen to make the caps thicker in the transition zones, near the cylindrical part of the vessel, where the stresses are relatively high, than toward the apices of the caps where the stresses are relatively low.

The following is an illustrative wrapping protocol for a 400 mm diameter mandrel with spherical caps, using 40 fiberglass strands 40 having a linear density of 2.4 g/m. It produces a vessel with a uniform wall thickness of 4 mm.

| stroke no. | diameter of fiber ring (mm) | corresponding geodesic angle (°) | a (°) |
| --- | --- | --- | --- |
| 1 | 20 | 3 | 20 |
| 2 | 50 | 6 | 20 |
| 3 | 80 | 12 | 20 |
| 4 | 110 | 16 | 20 |
| 5 | 140 | 20 | 20 |
| 6 | 170 | 25 | 20 |
| 7 | 200 | 30 | 35 |
| 8 | 230 | 35 | 35 |
| 9 | 260 | 42 | 35 |
| 10 | 280 | 44.5 | 35 |
| 11 | 300 | 48 | 55 |
| 12 | 320 | 52 | 55 |
| 13 | 340 | 57 | 55 |
| 14 | 360 | 63 | 55 |
| 15 | 380 | 72 | 83 |

The "geodesic angle" in column 3 is the winding angle that corresponds to the diameter of the associated fiber ring. This angle, like the corresponding diameter, increase continuously with stroke number; whereas the same body winding angle α is used in several consecutive strokes. This table illustrates the extent to which the anchoring provided by the fiber rings allows the winding angle to deviate from the geodesic angle.

Figure 13:
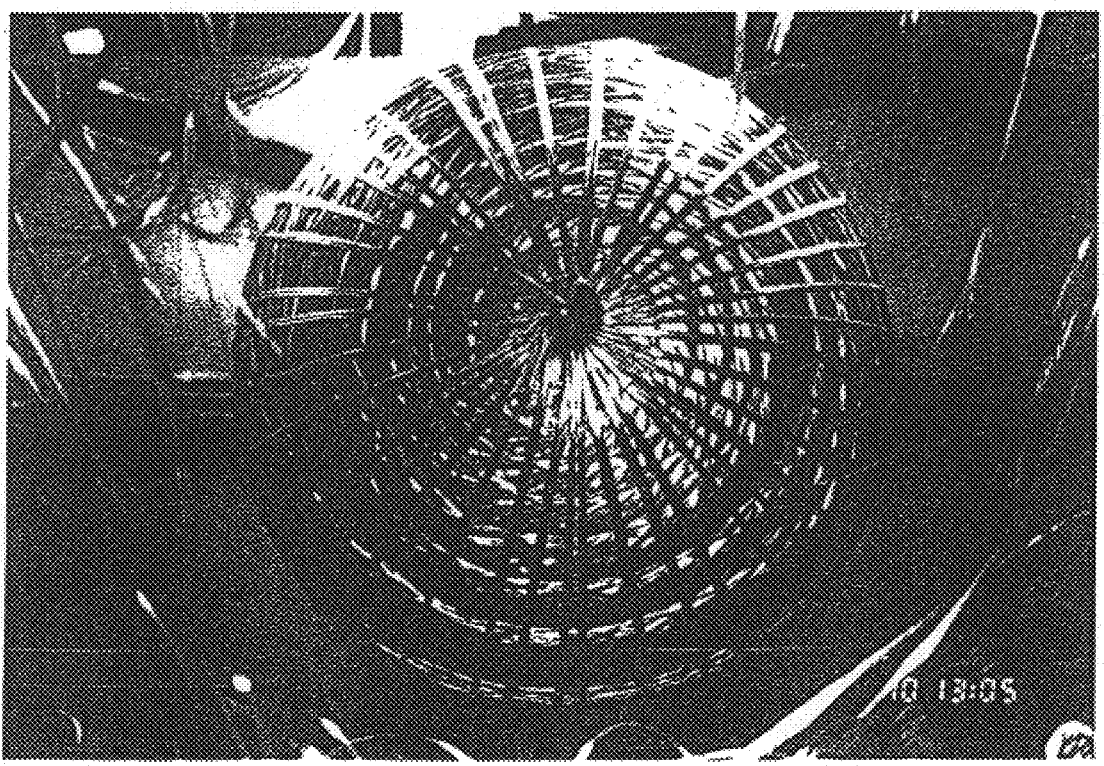
FIG. 13 is a photograph of a mandrel wrapped according to a wrapping protocol of the present invention.

FIG. 13 is a photograph of a mandrel 12 wrapped according to the above protocol. Note that the self-anchoring rings appear as concentric circular annuli.

Figure 6A:
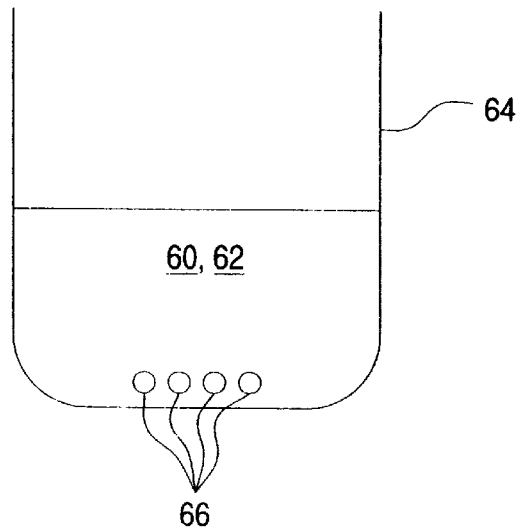
FIGS. 6A through 6C illustrate the process for mixing and degassing the liquid binder.

The liquid resin binder is prepared for application to the wrapped mandrel as follows. As shown in FIG. 6A, the desired amount of binder 60 and catalyst 62 is placed in a flexible container such as a plastic bag 64, along with several inert balls 66 of a density greater than the density of binder 60. Suitable binders and catalysts are readily available from manufacturers such as Dow Chemical Company of Midland Mich. who also provide technical advice on the correct ratio of binder and catalyst to use. Balls 66 typically are made of steel. Bag 64 may be made of any flexible polymeric material that does not react with binder 60. Polyethylene, being sufficiently inexpensive to render bag 64 disposable, is preferred as the material of bag 64. Binder 60 occupies about half of the volume of bag 64. Bag 64 then is sealed.

Figure 6B:
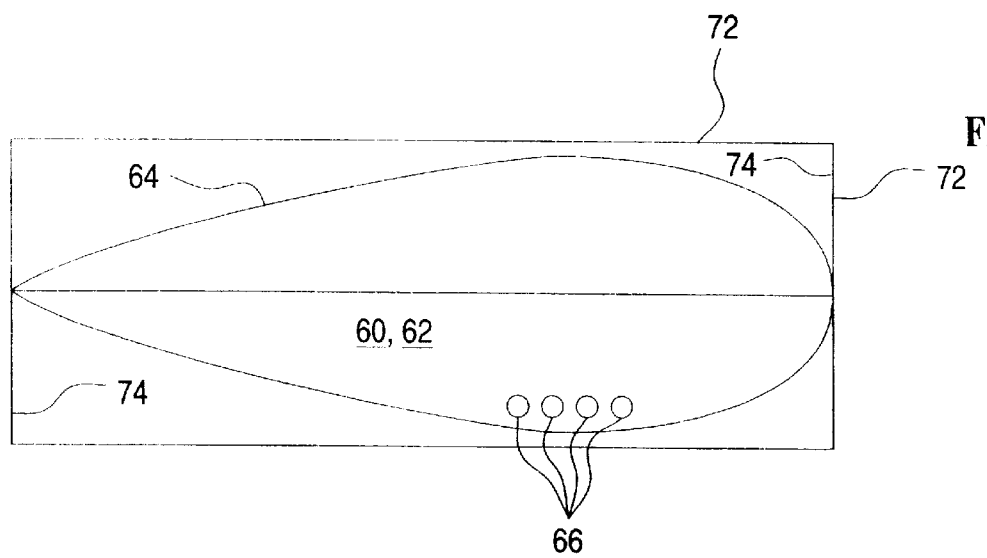
Figure 6C:
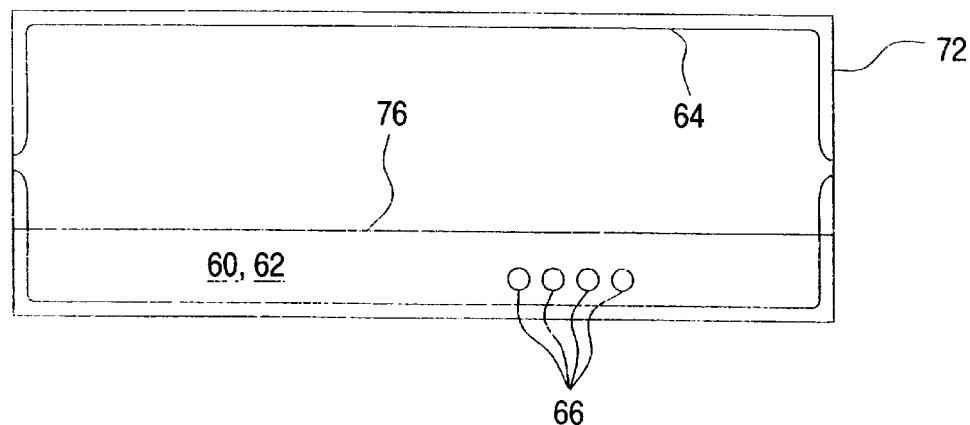

Bag 64 now is clamped inside a rigid airtight chamber 72 whose volume is about 10 times the volume of binder 60. Two ends of bag 64 are clamped to opposite interior walls 74 of chamber 72 so that bag 64 lies along the long dimension of chamber 72, as shown in FIG. 6B. Chamber 72 now is sealed and evacuated. Bag 64 expands to fill chamber 72, as shown in FIG. 6C. Binder 60 lies on the bottom of chamber 72, with an exposed upper surface 76. Chamber 72 is placed with the longest dimensions thereof lying horizontally, to maximize the area of surface 76. Chamber 72 now is agitated. The back-and-forth sloshing of binder 60 within bag 64, along with the mixing action of balls 66, mixes catalyst 62 with binder 60 to make a homogeneous mixture. The combination of the reduced pressure in bag 64 and the large exposed surface area of binder 60 promotes release of dissolved gases from binder 60. Chamber 72 now is repressurized and opened, and bag 64 is removed from chamber 72 and opened, Binder 60 now is ready for application to the wrapped mandrel.

Figure 7:
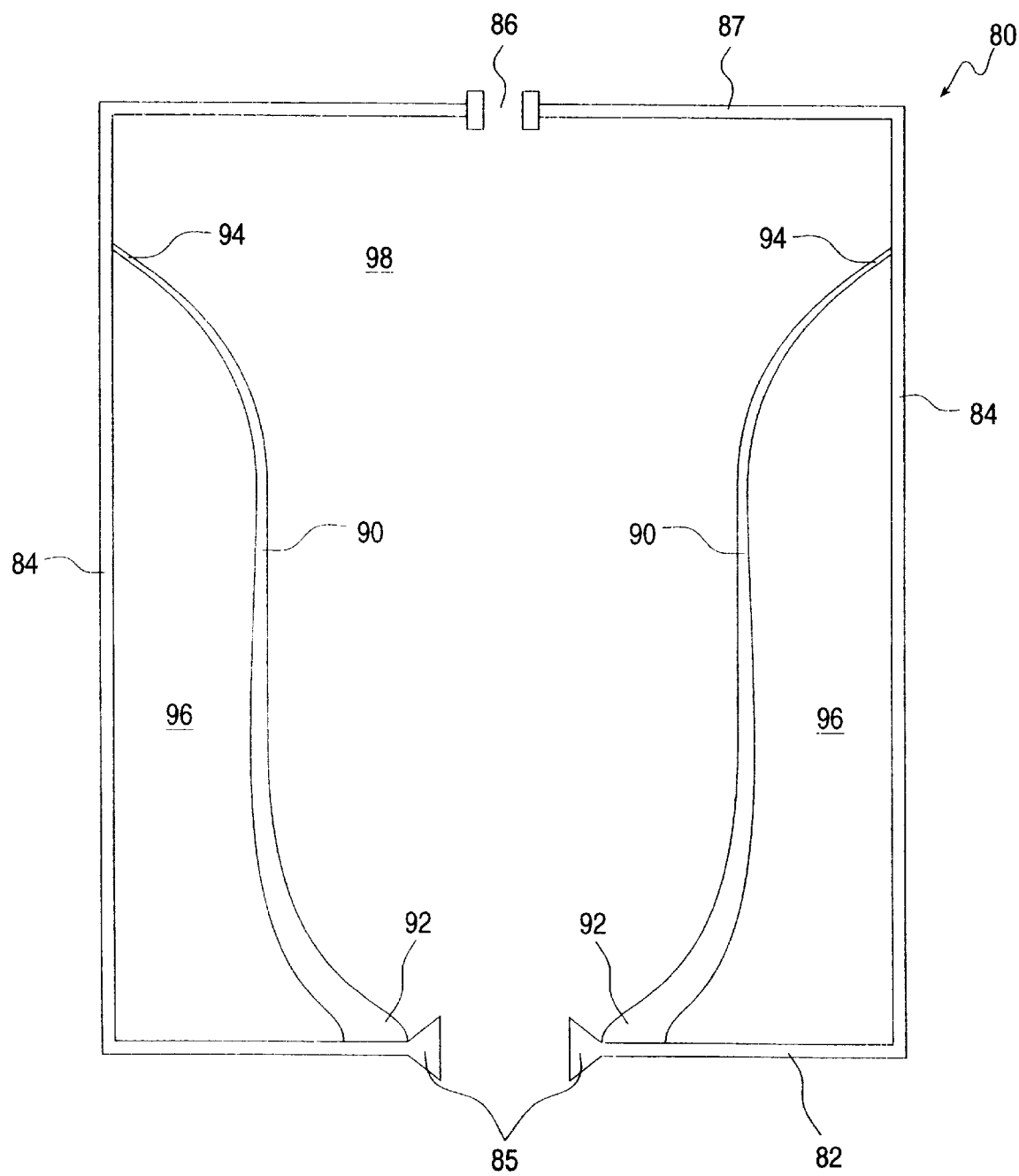
FIG. 7 is a schematic cross section of a chamber for coating a wrapped m andrel with liquid binder.

FIG. 7 is a schematic cross section of a chamber 80 for coating a wrapped mandrel with binder 60. Chamber 80 is double walled. The inner wall is a flexible annular sleeve 90, having a lower end 92 hermetically attached to the inside of base 82 of chamber 80, and having an upper end 94 hermetically attached to the inside of outer side wall 84 of chamber 80. Sleeve 90 is relatively thick at lower end 92 and gradually thins towards upper end 94. Sleeve 90 divides chamber 80 into an outer region 96 and an inner region 98. An aperture in base 82 is lined with a gasket 85 to receive the proximal end of the wrapped mandrel and form a pressure-tight seal against the chuck of the wrapped mandrel. Top 87 of chamber 80 is removed to allow the wrapped mandrel to be inserted into chamber 80 with the proximal end of the wrapped mandrel properly seated against gasket 85. Top 87 then is replaced and sealed. For simplicity, the construction that allows the reversible removal and sealing of top 87 is not shown. A port 86 in top 87 allows the introduction of the mixed and degassed binder into chamber 80.

FIGS. 8A and 8B are schematic cross sections of chamber 80 at two stages in the coating of a wrapped mandrel 88 with binder 60. Initially, with wrapped mandrel 88 inserted into chamber 80 and properly seated on gasket 85, chamber 80 is sealed, outer region 96 is evacuated, and inner region 98 is partly evacuated. The evacuation of outer region 96 pulls sleeve 90 against base 82 and side wall 84, as shown in FIG. 8A. Binder 60 is introduced into inner region 98 via port 86, through an aperture narrow enough to exclude balls 66. The partial vacuum in inner region 98 draws binder 60 into inner region 98. Binder 60 forms an annular pool around the proximal end of wrapped mandrel 88, as shown in FIG. 8A.

Now, air is admitted into outer region 96 from outside chamber 80. The increasing pressure in outer region 96 pushes sleeve 92 against wrapped mandrel 88 from the bottom up, i.e., from the proximal end of wrapped mandrel 88 to the distal end of wrapped mandrel 88. This in turn pushes an annulus of binder 60 upwards to sweep past wrapped mandrel 88. Because of the thinness of upper end 94 of sleeve 90, when outer region 96 is at atmospheric pressure, sleeve 90 almost entirely encloses wrapped mandrel 88, as shown in FIG. 8B, and binder 60 coats the entire outer surface of wrapped mandrel 88. Note that the portion of sleeve 90 shown below binder 60 in FIG. 8B contacts the outermost stroke of wrapped mandrel 88: binder 60 has been forced into the spaces between the strands. In practice, the admission of air into outer region 96 is stopped when binder 60 reaches port 86.

Subsequent treatment of coated wrapped mandrel 88 inside chamber 80 is as follows:

Outer region 96 is cyclically pressurized and depressurized. This serves to release trapped air from the strands and the binder coating of wrapped mandrel 88.

Wrapped mandrel 88, which had been internally pressurized at between 2 and 3 atmospheres during the wrapping process, now is further pressurized via chuck 26, preferably to the design pressure of the ultimate reinforced composite vessel. In addition, wrapped mandrel 88 is vibrated. These two actions have the effect of redistributing the tension in the strands of wrapped mandrel 88 to put all of the strands under approximately the same tension. This is necessary because as the strands of inner strokes are wrapped by the strands of outer strokes, the outer strokes tend to slightly compress wrapped mandrel 88, thereby releasing some of the tension on the strands of the inner strokes. This redistribution of tension is facilitated by the fact that uncured liquid binder 60 acts as a lubricant.

Outer region 96 now is pressurized to about 90% of the internal pressure of wrapped mandrel 88, and this pressure is varied cyclically, to induce further uniformity in the spatial distribution and in the tension of the strands of wrapped mandrel 88. Part of the pressure in outer region 96 is released, and inner region 98 is pressurized, although not to quite the same pressure as outer region 96. For example, if outer region 96 is at a pressure of 7 atmospheres, inner region 98 is pressurized to 5 atmospheres. In fact, the preferred range of pressures are from 2 to 7 atmospheres for outer region 96 and up to 5 atmospheres for inner region 98. This compresses the coating of binder 60 on wrapped mandrel 88 for a final release of trapped air.

Finally, wrapped mandrel 88 is heated internally to cure the coating of binder 60.

Figure 9:
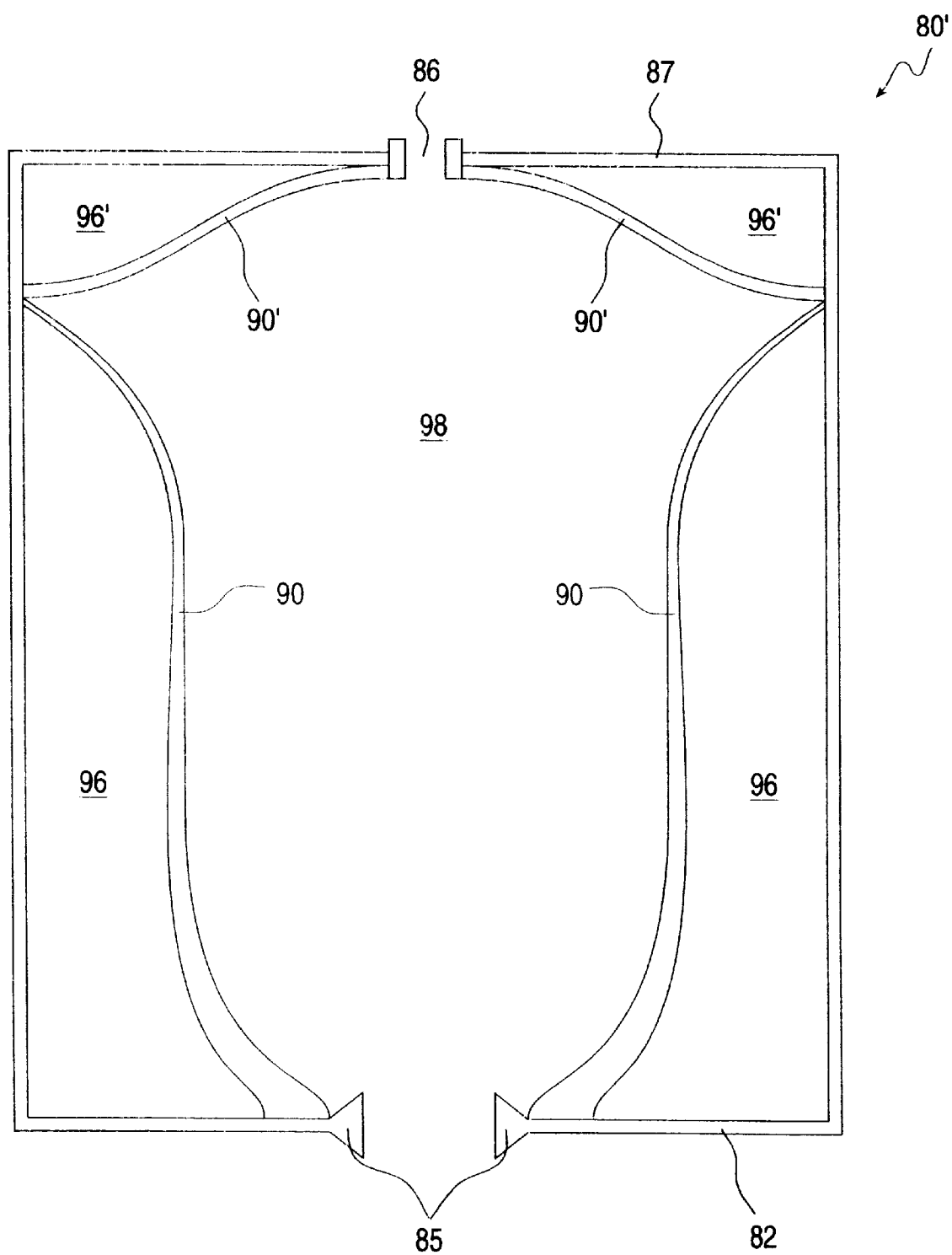
FIG. 9 is a schematic cross section of a variant of the chamber of FIG. 7.

FIG. 9 shows a variant 80' of chamber 80. Chamber 80' has two flexible annular sleeves, sleeve 90 as in chamber 80, and also an auxiliary upper sleeve 90' that defines an auxiliary outer region 96'. Otherwise, chamber 80' is identical to chamber 80, and is used in the same way to coat a wrapped mandrel with binder 60, it being understood that the pressurizations and depressurizations described above for outer region 96 are, in the case of chamber 80', applied to both outer regions 96 and 96'. Chamber 80' provides more precise control of the coating of the mandrel near the closed end of the final reinforced composite vessel.

Figure 10:
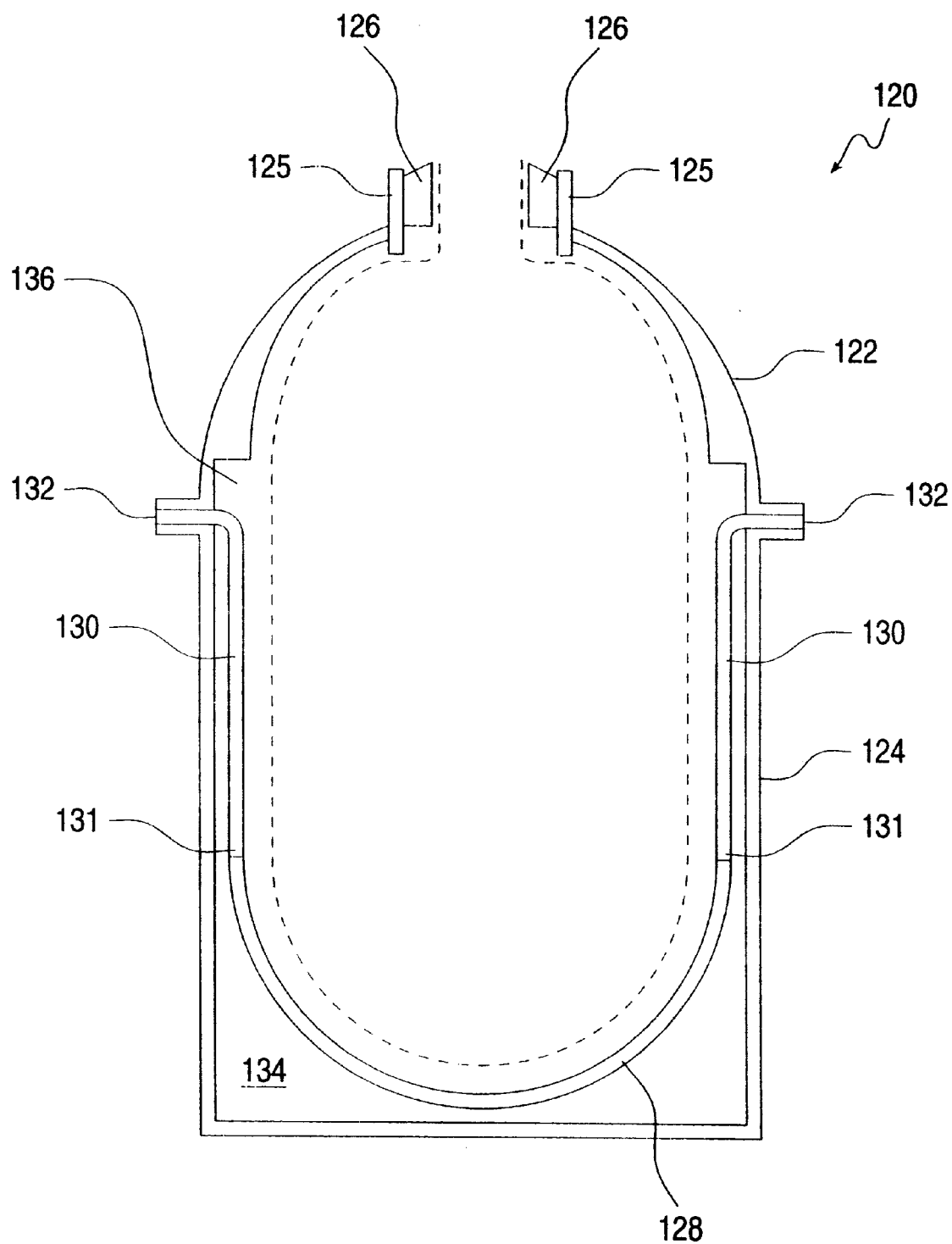
FIG. 10 is a schematic cross section of a chamber of a second design.

FIG. 10 is a schematic cross section of a chamber 120, of a second design, for coating a wrapped mandrel with binder 60. Chamber 120 includes a rigid upper housing portion 122 and a rigid lower housing portion 124. The position of the wrapped mandrel within chamber 120 is indicated by a dashed line. Note that the wrapped mandrel is positioned in chamber 120 with its proximal end and chuck pointing upwards. This is opposite to the orientation of wrapped mandrel 88 in chamber 80. The inner surface of upper housing portion 122 is shaped to match the proximal end of the wrapped mandrel. The apex of upper housing portion 122 is provided with a cylindrical ring 125 adapted to slide vertically with respect to upper housing portion 122. The inner surface of ring 125 is provided with a gasket 126 to provide a pressure-tight seal against the chuck of the wrapped mandrel. Within chamber 120 is a flexible annular sleeve 130 that is attached at lower end 131 thereof to the periphery of a rigid cup 128. The inner surface of cup 128 is shaped to match the distal end of the wrapped mandrel. Upper end 132 of sleeve 130 is sandwiched between upper housing portion 122 and lower housing portion 124 as shown. Sleeve 130 and cup 128 define an inner region 136 and an outer region 134 that are analogous to corresponding regions 98 and 96 of chamber 80.

To coat a wrapped mandrel with binder 60 using chamber 120, binder 60 is first placed in cup 128. Then the wrapped mandrel is placed in chamber 120 in the indicated position and chamber 120 is sealed. Inner region 136 is depressurized and outer region 134 is pressurized to sweep an annulus of binder 60 past the wrapped mandrel. The ability of ring 125 to slide vertically allows the pressure difference between inner region 136 and outer region 134 to push the wrapped mandrel upward, so that when binder 60 reaches the top of chamber 120, the appropriately shaped inner surface of upper housing portion 122 forces binder 60 into the voids surrounding the strands that wrap the proximal end of the mandrel.

Figure 11:
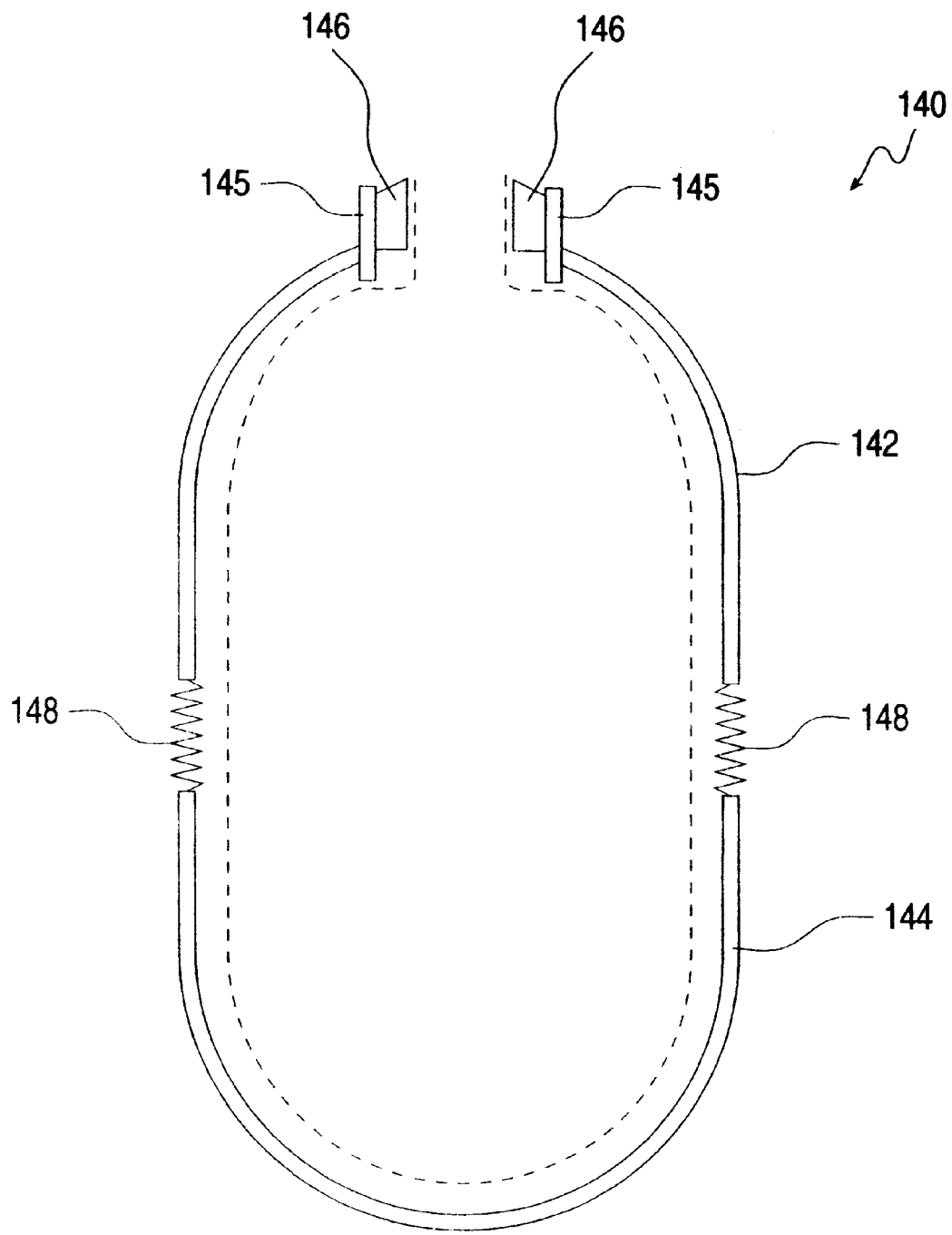
FIG. 11 is a schematic cross section of a chamber of a third design.

FIG. 11 is a schematic cross section of a chamber 140, of a third design, for coating a wrapped mandrel with binder 60. Chamber 140 includes a rigid upper housing portion 142 and a rigid lower housing portion 144, connected by an expandable bellows 148. As in FIG. 10, the position of the wrapped mandrel within chamber 140 is indicated by a dashed line. Note that the orientation of the wrapped mandrel in chamber 140 is identical to the orientation of the wrapped mandrel in chamber 120. As in the case of upper housing portion 122 of chamber 120, upper housing portion of chamber 140 is provided with a cylindrical ring 145 and a gasket 146 to allow the wrapped mandrel to move vertically within chamber 140. The inner surfaces of upper and lower housing portions 142 and 144 are shaped to match the adjacent surfaces of the wrapped mandrel when chamber 140 is compressed as described below.

To coat a wrapped mandrel with binder 60 using chamber 140, binder 60 is first placed at the bottom of lower housing portion 144. Then the wrapped mandrel is placed in chamber 140 in the indicated position. Now, chamber 140 is compressed by urging lower housing portion 144 upward, thereby causing binder 60 to sweep past the wrapped mandrel. Strictly speaking, the shape of the body of binder 60 that sweeps past the wrapped mandrel is initially cup-shaped, and becomes an annulus when the base of lower housing portion 144 contacts the apex of the wrapped mandrel. Nevertheless, binder 60 sweeps past the wrapped mandrel in an annular fashion, in the sense that the advancing front of binder 60 is in the form of a ring around the wrapped mandrel.

While the invention has been described with respect to a limited number of embodiments, it will be appreciated that many variations, modifications and other applications of the invention may be made.

What is claimed is:

1. A method for wrapping a mandrel having a cylindrical body and a convex, cylindrically symmetrical cap, the cap having an apex, comprising the steps of:
    (a) feeding at least two strands towards the mandrel from ports positioned at substantially equal azimuthal intervals around the mandrel;
    (b) initially, translating the mandrel with respect to said ports in a first axial direction so that the apex of the cap approaches said ports, while
        rotating the mandrel with respect to said ports in a certain azimuthal direction;
    (c) translating the mandrel axially with respect to said ports in a direction opposite to said first axial direction, while
        continuing to rotate the mandrel with respect to said ports in said certain azimuthal direction,
            said translating and rotating being effected at a first mutual ratio while said at least two strands are applied to the cap, thereby causing portions of said at least two strands to mutually overlap at a first radial distance from the apex, thereby anchoring said at least two strands on the cap at said first radial distance from the apex;
    (d) subsequently, translating the mandrel axially with respect to said ports in said first axial direction so that the apex of the cap again approaches said ports, while continuing to rotate the mandrel with respect to said ports in said certain azimuthal direction; and
    (e) translating the mandrel axially with respect to said ports in said direction opposite to said first axial direction, while continuing to rotate the mandrel with respect to said ports in said certain azimuthal direction; said subsequent translating and rotating being effected at a second mutual ratio, substantially different from said first mutual ratio, while said at least two strands are applied to the cap, thereby causing portions of said at least two strands to mutually overlap at a second radial distance from said apex that is substantially different from said first radial distance, thereby anchoring said at least two strands on the cap at said second radial distance from the apex.

2. The method of claim 1, wherein said initial translating in said first axial direction and said rotating are effected at a third mutual ratio while said at least two strands are applied to the body of the mandrel, and wherein said initial translating opposite to said first axial direction and said rotating are effected at a fourth mutual ratio while said at least two strands are applied to the body of the mandrel.

3. The method of claim 2, wherein said third mutual ratio and said first mutual ratio are substantially equal.

4. The method of claim 2, wherein said third mutual ratio and said first mutual ratio are substantially different.

5. The method of claim 2, wherein said first mutual ratio and said fourth mutual ratio are substantially equal.

6. The method of claim 2, wherein said first mutual ratio and said fourth mutual ratio are substantially different.

7. The method of claim 1, wherein a sufficient number of said strands are fed towards the mandrel so that said mutual overlaps form a substantially continuous self-anchoring ring on the cap.

8. A method for producing a reinforced vessel, comprising the steps of:

(a) providing a winding apparatus including:
  (i) a mandrel having a proximal end, a distal cap and a longitudinal axis, said mandrel being supported externally only at said proximal end, said distal cap including an apex, and
  (ii) a plurality of ports, each of said ports for delivering a strand to said mandrel, said ports being disposed circumferentially around said longitudinal axis;
(b) tying said strands together at said longitudinal axis, external to said mandrel, thereby forming a first knot;
(c) positioning said mandrel with said apex touching said first knot;
(d) translating said mandrel relative to said ports to apply said strands to said distal cap;
(e) wrapping said mandrel with said strands by translating and rotating said mandrel relative to said ports, said ports being adjacent to said apex when said wrapping is finished; and
(f) translating said mandrel away from said ports while rotating said mandrel, thereby forming a rope of said strands emerging from said apex.

9. The method of claim 8, further comprising the steps of:
  (g) tying said strands of said rope at said ports, thereby forming a second knot; and
  (h) cutting said rope between said apex and said second knot.

10. The method of claim 9, further comprising the step of:
  (i) tying said strands of said rope at said apex, thereby forming a third knot;

said cutting of said rope being effected between said second knot and said third knot.

11. The method of claim 8, wherein said positioning of said mandrel with said apex touching said first knot is effected subsequent to said forming of said first knot.

12. The method of claim 8, wherein said translating of said mandrel relative to said ports to apply said strands to said distal cap is effected without rotating said mandrel.

* * * * *